May 1, 1962     G. W. FITE, JR     3,031,932
ANTI--RADIATION AND DUNNAGE DEVICE
Filed April 19, 1960
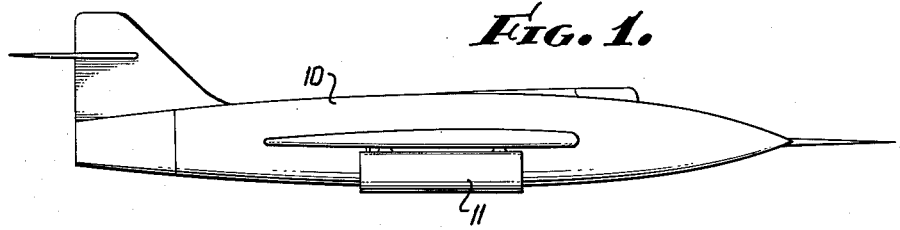
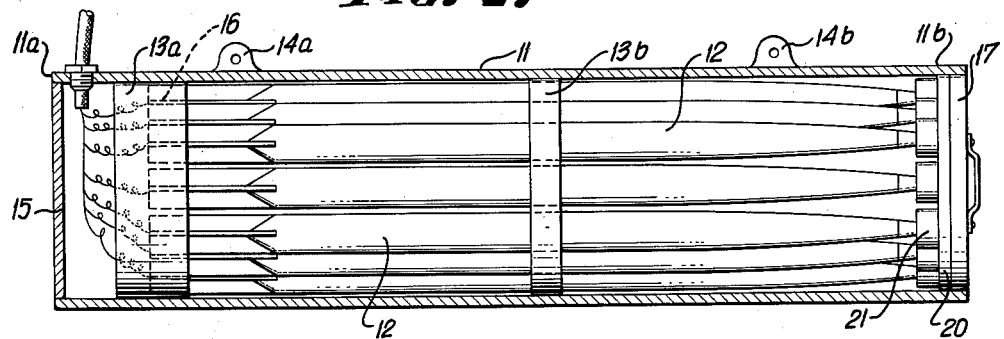
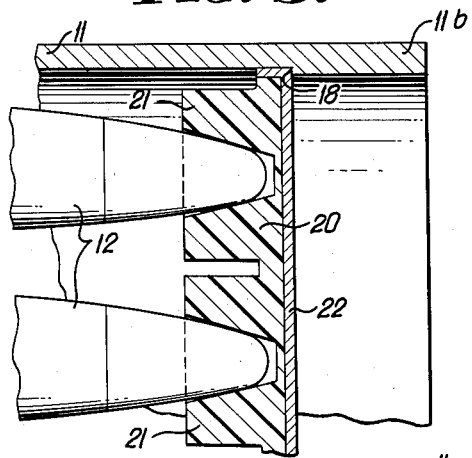
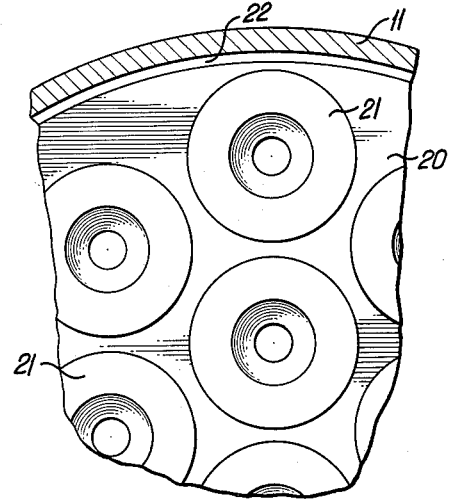
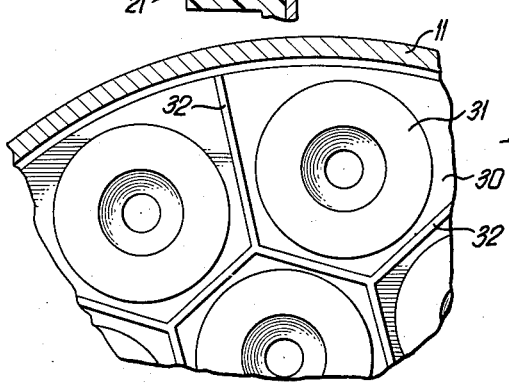
INVENTOR.
GEORGE WALLACE FITE, JR.
BY
ATTORNEYS.

United States Patent Office 3,031,932
Patented May 1, 1962

3,031,932
ANTI-RADIATION AND DUNNAGE DEVICE
George Wallace Fite, Jr., North Hollywood, Calif., assignor to Mimx Corporation, Glendale, Calif., a corporation of California
Filed Apr. 19, 1960, Ser. No. 23,284
8 Claims. (Cl. 89—1.7)

This invention relates to an anti-radiation and dunnage device for casings or housings in which radiation-sensitive articles are adapted to be transported and out of which the radiation-sensitive articles are used or removed, and in particular such a device for rocket casings or pods which house the rockets during shipping and which are mounted on an aircraft for firing of the rockets.

There are many articles which are sensitive to radiation and are damaged thereby if not protected. It is not too difficult to protect these articles from radiation during shipping or transportation, but when the articles are to be used they are necessarily exposed and thereby are adapted to be damaged. This is the situation in transporting and firing rockets from rocket casings or pods; and without being limited thereto, the present invention will be described in combination with rockets and rocket casings, it being understood that the present invention may also be used with other articles.

For localized warfare, increased fire power is needed for each weapon. By providing a plurality of rockets within a single casing, a weapon having tremendous fire power is available. This type of weapon has been extensively used for some time and is quite flexible as it may be used on land, on ships or on aircraft.

Rockets and the igniter systems for firing the rockets are extremely sensitive to radiation and heretofore there has been a serious problem in rockets being pre-ignited due to stray radiation. Electromagnetic waves used in radar and other communication systems are increasingly more prevalent today and stray radiation from these waves has caused the rockets to be pre-ignited.

When the rockets were to be fired, the forward end of the rocket casing was uncovered to expose the rockets. However, considerable time generally elapsed before the rockets were fired, thus presenting an opportunity for stray radiation to enter the open end of the rocket casing. The stray electromagnetic waves created standing waves in the electrical igniter systems for the rockets and created electrical charges, causing the igniters to be actuated. The rockets were therefore pre-ignited due to stray radiation and as a result of this unpredictable firing of the rockets, a very dangerous condition prevailed. This was particularly true when a fully loaded rocket casing or pod was mounted on an aircraft, generally below the wing, thus requiring the shipping cover to be removed before the aircraft took off, to expose the rockets.

The present invention completely overcomes all of the problems presented heretofore in an extremely simple, economical and very effective manner. A frangible anti-radiation device is provided within the rocket casing for preventing stray radiation from pre-igniting the rockets when ready to be used and for use as a dunnage member during transportation of the rockets. It is understood that the rockets are fired directly through the frangible and pierceable device without damage to or misdirection of the rockets, even when fired in a pattern or time-delayed sequence. With such a device, a single casing may be used for both transporting the rockets and for housing the rockets when they are fired, without danger of pre-ignition.

Accordingly, it is a general object of the present invention to provide an anti-radiation and dunnage device that overcomes all of the foregoing problems.

An object of the present invention is to provide a device which functions as a dunnage member during transportation of articles and which prevents radiation from damaging the articles when ready for use.

A further object is to provide a novel anti-radiation and dunnage device for a rocket casing for preventing pre-ignition of the rockets due to stray radiation.

Other objects and many of the attendant advantages of this invention will be readily appreciated as the same become better understood by reference to the following detailed description when considered in connection with the accompanying drawings, wherein:

FIG. 1 is a side elevation of an aircraft carrying beneath its wing an exemplary device of the present invention;

FIG. 2 is a longitudinal section of a rocket pod or casing with the shipping cover assembled for use during transportation;

FIG. 3 is a fragmentary, enlarged, longitudinal section of the forward end of the rocket pod or casing of FIG. 2 with the shipping cover removed whereby the rockets are in condition for actual use or firing;

FIG. 4 is a transverse section of the device of FIG. 3 showing the rocket holders on the rear face of the frangible dunnage member with the rockets removed; and FIG. 5 is another embodiment of the present invention and is a view similar to FIG. 4.

In the broadest concept of the present invention there is provided means for securely supporting articles sensitive to radiation during shipping or transportation and for protecting said radiation-sensitive articles from being damaged by radiation both during transportation and prior to and during actual use of the articles.

Referring now to the drawings, wherein like reference numerals designate like or corresponding parts throughout the several views, there is shown in FIG. 1 an aircraft 10 carrying a rocket pod or casing 11 which is an exemplary device of the present invention. A plurality of rockets 12 may be carried in the casing 11 and may be held, supported, and uniformly spaced apart therein by transverse supporting webs 13a and 13b which are of well known design and will not be described in detail.

The casing 11 is provided with suspending flanges 14a and 14b for receiving detachable hook means carried on the wing of the aircraft 11. It is understood that generally after the rockets 12 have been fired, the rocket casing or pod 11 is jettisoned as it is only extra weight and no longer serves any function. The rear end 11a of the rocket casing 11 is preferably closed by a detachable cover 15 both during transportation and when the casing 11 is mounted on the aircraft for firing. The rear cover 15 may be removed when the rockets 12 are being loaded into the casing 11, allowing access to igniters 16 and the igniter wiring system connected to the rear end of each rocket 12. It is understood that igniters 16 and the wiring system therefor are standard and well known and are shown in a diagrammatic manner for simplicity and clarity.

The forward open end 11b of the rocket casing 11 is provided with a transversely extending frangible member 20 which is used for a dunnage device and for preventing radiation from pre-igniting the rockets, and a front shipping cover 17. The shipping cover 17 is generally made of metal, as preferably are the casing 11 and rear cover 15, and is only assembled on the casing 11 during shipping of the fully loaded casing. When the rocket casing 11 is to be mounted on the aircraft 10 or prior to when the rockets are to be fired, the shipping cover 17 is removed, as shown in FIG. 3. However, the frangible member 20 is not removed but is rigidly attached to the casing 11, as will be described hereinafter.

The frangible member 20 is an anti-radiation and dunnage device and is rigidly carried within and extends transversely across the open forward end 11b of the rocket casing 11 out of which rockets 12 are fired directly through the frangible member 20. Any suitable means may be provided for rigidly mounting member 20 within casing 11 such as a circumfrentially extending shoulder 18 on the inner surface of casing 11 or spring means carried in the casing 11 for allowing the member 20 to be assembled from either end of the casing.

The rear side of the frangible, anti-radiation and dunnage device 20 facing the rockets 12 is provided with a plurality of rearwardly facing rocket or article holders 21 for receiving the noses of rockets 12 carried within the casing 11. Each rocket holder 21 is concaved and has a relatively thin front wall through which the rockets 12 are fired. The holders 21 are spaced a sufficient distance from each other to allow for the spreading of the material of each rocket holder when the rockets are fired therethrough so as to prevent a buildup or accumulation of material in the path of adjacent rockets causing the adjacent rockets to be misdirected when fired. This is extremely important when the rockets are fired in a pattern or time-delayed sequence, even though seconds or only microseconds intervene between firings.

Each rocket holder 21 prevents its respective rocket 12 from becoming dislodged and damaged during transportation in the casing 11 and is made of a dielectric material for safety purposes.

The other side of the frangible member 20 is provided with means for preventing stray radiation from passing through the member 20 into the rocket casing 11 and pre-igniting the rockets 12, as described hereinabove. Such means may be a thin layer 22 of metallic or ferrite or polyirons forming a barrier or shield for interrupting and dissipating radiation passing through the forward end 11b of the casing.

While various materials may be used for the member 20, it has been found that thermoplastics such as polypropylene foam or polystryrene foam are extremely well suited for this purpose. Polypropylene foam may be molded into the desired shape of member 20 and during the molding process a layer of metallic particles 22 may be sprayed on one side thereof to form the radiation barrier. It is preferred that this metallic layer 22 extend around onto the side of the member 20 as shown in FIG. 3 to prevent radiation from passing between the member 20 and casing 11. The molded member 20, including the rocket holders 21 and metallic barrier 22, is therefore a homogeneous device that is inexpensively produced.

It has been found that when polypropylene foam is used for the member 20, the proper degree of frangibility and brittleness of the material can be obtained by applying high voltage electrons thereto. Such an irradiation method on polypropylene and other suitable materials causes the material to be sufficiently frangible but still retain the required tensile strength to support the articles and prevent them from becoming dislodged and damaged in the casing. It has been found that radiation applied on the order of two megavolts on the cathode is sufficient to cause the polypropylene to become sufficiently frangible. When the rockets or articles are to be fired or used, the rockets can pierce the frangible member 20 without undue resistance.

It should be understood that an anti-radiation, metallic layer 22 may be made of various materials such as zinc or aluminum bonded to the member 20 either through molding or by a bonding agent. When radiation or electromagnetic waves strike the layer 22, the radiation is dissipated and prevented from passing therethrough. Radiation such as radar or other communication waves having very high frequency, such as 20 to 400 megacycles, set up a field in the metallic particles of the anti-radiation layer 22, are dissipated and are therefore prevented from pre-igniting the rockets.

In FIG. 5, another embodiment of the present invention is shown as a frangible, anti-radiation and dunnage device 30 similar to the member 20 in FIGS. 1 and 4. The device 30 is identical in all respects with device 20 except for the addition of partition walls 32 extending from at least one side of the frangible device 30 and between rocket holders 31 for restricting transverse movement of the material of the holders 31 into the path of adjacent rockets, particularly when fired in a pattern. These partition walls 32 may be made of various materials and should be sufficiently rigid and non-brittle to remain standing after the rockets are fired and prevent material of the holders 31 from spreading transversely. Therefore, means are provided for insuring that regardless of the firing order of the rockets, the rockets will not be fired off course because of material from adjacent rocket holders.

It can therefore be understood that the present invention provides a device for preventing radiation from damaging articles carried in a casing either during shipping or in actual use and also for use as a dunnage member during shipping of the articles in the same casing. Heretofore, stray radiation had pre-ignited rockets in rocket pods, causing serious damage. This is entirely overcome by the present invention.

Obviously many modifications and variations of the present invention are possible in the light of the above teachings. It is therefore to be understood that within the scope of the appended claims the invention may be practiced otherwise than as specifically described.

I claim:

1. In combination with a rocket casing in which rockets are adapted to be transported and out of which rockets are adapted to be fired, the provision of an anti-radiation and dunnage device, comprising: a frangible member rigidly carried within and extending transversely across the open forward end of the rocket casing out of which rockets are fired directly through the frangible member, the rear side of said frangible member having a plurality of rearwardly facing rocket holders for receiving the noses of rockets carried within the rocket casing, each rocket holder preventing its respective rocket from becoming dislodged during transportation, each rocket holder being made of a dielectric material, being concave and having a relatively thin front wall through which its respective rocket is adapted to be fired, the front side of said frangible member including a layer of metallic material for absorbing and dissipating outside radiation in the atmosphere and for preventing radiation from passing into the rocket casing and pre-igniting the rockets.

2. In combination as stated in claim 1 wherein said rocket holders are spaced a sufficient distance from each other to allow for the spreading of the material of each rocket holder when the rockets are fired therethrough so as to prevent a buildup of material causing the adjacent rockets to be misdirected when fired in a pattern.

3. An anti-radiation and dunnage device for a rocket casing in which rockets are adapted to be transported and out of which rockets are adapted to be fired, comprising: a frangible member adapted to transversely extend across the open forward end of a rocket casing out of which rockets are fired directly through the frangible member, one side of said frangible member having a plurality of spaced, dielectric rocket holders for receiving the noses of rockets carried within a rocket casing and for preventing the rockets from becoming dislodged during transportation, the other side of said frangible member having a layer of metallic material for preventing radiation from passing through the frangible member and into the rocket casing and pre-igniting the rockets.

4. An anti-radiation and dunnage device as stated in claim 3 wherein said frangible member is made of irradiated, thermoplastic foam material of sufficient tensile strength for supporting the rockets during transportation but readily pierceable by the rockets when fired.

5. An anti-radiation and dunnage device as stated in claim 3 wherein each of said rocket holders is concaved and has a relatively thin front wall through which the rockets are fired, said holders are spaced a sufficient distance from each other to allow for the spreading of the material of each rocket holder when the rockets are fired therethrough so as to prevent a buildup of material causing the rockets to be misdirected when fired in a pattern.

6. An anti-radiation and dunnage device as stated in claim 3, including partition walls extending from said one side of said frangible member and between said rocket holders for restricting transverse movement of the material of the rocket holders into the path of adjacent rockets when fired in a pattern.

7. In combination with an article casing in which articles sensitive to radiation are adapted to be transported and out of which the articles sensitive to radiation are to be used, the provision of an anti-radiation and dunnage device comprising: a frangible member rigidly carried within and extending across the end of the casing out of which the articles are to be removed from the casing, the side of the frangible member facing the articles which are adapted to be in the casing including a plurality of article holders for supporting the articles and for preventing the articles from becoming dislodged during transportation, the article holders being made of a dielectric material, the other side of said frangible member having a layer of metallic material for preventing radiation from passing through the frangible member and into the casing and damaging the radiation sensitive articles.

8. In a combination as stated in claim 7, wherein said frangible member is made of irradiated thermoplastic foam material of sufficient strength for supporting the articles during transportation but readily pierceable when the articles are to be used.

References Cited in the file of this patent

UNITED STATES PATENTS

| 1,179,417 | Feller | Apr. 18, 1916 |
| 2,844,073 | Re et al. | July 22, 1958 |
| 2,872,867 | Huntoon | Feb. 10, 1959 |

FOREIGN PATENTS

| 578,034 | Canada | June 23, 1959 |